United States Patent [19]

Von Haas et al.

[11] Patent Number: 5,065,492
[45] Date of Patent: Nov. 19, 1991

[54] METHOD OF AND ASSEMBLY FOR RELEASABLY CONNECTING A TOOL HEAD TO A TOOL BASE HOLDER OF A TOOL TURRET MACHINE TOOL

[75] Inventors: Rainer Von Haas, Geestnacht; Hans Tack, Velberg, both of Fed. Rep. of Germany

[73] Assignee: Krupp Widia GmbH, Essen, Fed. Rep. of Germany

[21] Appl. No.: 414,898

[22] Filed: Sep. 29, 1989

[30] Foreign Application Priority Data

Oct. 1, 1988 [DE] Fed. Rep. of Germany ....... 3833511

[51] Int. Cl.⁵ ............................................. B23B 29/04
[52] U.S. Cl. ...................................... 29/426.6; 29/40; 29/39; 82/159; 82/160; 82/161; 82/121
[58] Field of Search .................. 82/159, 158, 160, 161, 82/121, 120; 29/426.6, 37 R, 38 R, 39, 40, 41

[56] References Cited

U.S. PATENT DOCUMENTS

| 4,406,195 | 9/1983 | Kruger | 82/160 |
| 4,414,724 | 11/1983 | Garnett | 82/160 |
| 4,499,800 | 2/1985 | Stahl | 82/158 |
| 4,747,735 | 5/1988 | Erickson | 82/160 |
| 4,890,523 | 1/1990 | Satran | 82/160 |

FOREIGN PATENT DOCUMENTS

| 101917 | 3/1984 | European Pat. Off. | 82/160 |
| 2163379 | 2/1986 | United Kingdom | 82/160 |

*Primary Examiner*—D. s. Meislin
*Assistant Examiner*—Blynn Shideler
*Attorney, Agent, or Firm*—Herbert Dubno

[57] ABSTRACT

A machine tool turret having a plurality of tool holders with tension rod-actuated mechanisms for locking the tool head can be rotated to bring a selected tool holder into engagement with jaws of a release unit, applying to the tension rod a force sufficient to compress the disk spring stack thereof and release the tool and to the holder a counterforce which is equal and opposite in direction and prevents the release unit from stressing the bearings of the turret or any spindle bearings which may make the tool holder rotatable.

13 Claims, 8 Drawing Sheets

METHOD OF AND ASSEMBLY FOR RELEASABLY CONNECTING A TOOL HEAD TO A TOOL BASE HOLDER OF A TOOL TURRET MACHINE TOOL

FIELD OF THE INVENTION

Our present invention relates to the mounting and dismounting of a tool head in a tool holder, particularly in a tool holder of one of a plurality of such tool holders on a revolver or turret of a machine tool. More particularly, the invention relates to a method of operating an assembly for holding a tool in this context and to the assembly which can be operated by the improved method.

BACKGROUND OF THE INVENTION

In systems which are being increasingly automated, a tool change for a machine tool may involve the selection by a gripper of a tool from a tool magazine, the transfer of the selected tool to a tool holder, the engagement of the selected tool by the tool holder so that the latter continues to be gripped after the tool holder is moved from its position in which the tool is mounted thereon, the engagement of a tool no longer required by the gripper, the release of the engaged tool from the tool holder and the return of the removed tool to the magazine.

The tool holder can be one of a number of such tool holders mounted upon a turret.

The use of automated mechanisms of this type in machine tools nevertheless requires that precision and resistance to forces and stresses be insured in the connection between the tool and the tool holder, particularly when the tool is only a portion of the entire structure, i.e. a cutter and a tool head supporting same. In that case, the tool head may be connectable to a tool shaft which forms the holder and is referred to herein as a tool base holder. The latter can have a shaft portion extending away from the tool head.

In this case, the above described tool replacement need not involve the entire tool, but only the active part thereof, namely, the tool head which is formed with a cutting plate or the like.

This has the advantage that the manipulators and other devices for handling the tool head and effecting the exchange can be dimensioned somewhat smaller than would be the case if the entire tool had to be changed because of the small dimensions and relatively low weight of the tool head. The magazine itself may equally be of reduced size.

An arrangement in which a tool head can be mounted upon a tool base holder is described, for example, in German Patent Document 30 07 440. In this case, the tool base holder receives an axially movable tension rod which has a head actuating a locking mechanism within the tool base holder. This head end of the rod is turned toward the tool head and the mechanism can comprise radially outwardly displaceable locking pins which can be driven outwardly when the tension rod is driven in the opposite direction so that these pins engage in recesses in the tool head or carrier.

The tension is generated by a prestressed disk spring stack, i.e. a stack of Belleville springs, which can be braced against a shoulder or flange at the opposite end of the tension rod.

In this system, to release the tool carrier from the tool holder, an external force must be applied to the tension rod, sufficient to overcome the spring bias applied thereto.

This releasing force or relief of the tension is generally applied from the exterior by mechanical, hydraulic or pneumatic means.

Advantageously, this clamping system allows very short tool replacement times to be realized, although during the tool replacement operation extremely high forces may have to be applied to the rod to overcome the force of the disk spring stack. The result is extreme force application to the tool holder and to the turret itself since the latter must resist the forces applied to release the tool carrier. As a consequence, the journals of the turret may be inordinately stressed and, if they are not dimensioned adequately to resist such stress, there is a rapid breakdown of the entire system. Even if the turret system is dimensioned to take up such stresses, however, the repeated application of high unbalnced forces can result in early failure.

To overcome this drawback at least in part, it has already been provided in the United Kingdom Patent Documents 21 63 379 and 21 54 479, to utilize a stress generating unit which applies a force via a hydraulic piston and a pressure transformer (pressure amplifier). Since each tool holder of a tool turret must include such a stressing unit, a system with a hydraulic piston and pressure transformer arrangement entails very high capital cost.

The hydraulic pressure transformer system for each tool must be separated from other systems or provided with separate circulation paths or cutoffs so that, upon repair or maintenance, there will be no total draining of the hydraulic medium of such systems. This again increases the capital and maintenance costs.

It is also known to provide mechanically actuated tool holders and to axially shift the tension rod by a nut utilizing a screw system. The rod is thus placed under compression or tension by the screw system. While such an arrangement is relatively insensitive to vibration and insures an effective locking, the serviceability is poor and it requires considerable manual work. It is not as amenable to automation as the hydraulic or clamping systems which have been previously described.

OBJECTS OF THE INVENTION

It is, therefore, the principal object of the present invention to provide an improved method of operating a tool locking assembly and a tool locking assembly operated by the improved method whereby the above described drawbacks can be avoided.

Another object of this invention is to provide an improved apparatus for the mounting of a tool on a tool turret and which permits release of the tool by the application of a force to the tension rod without significantly loading the spindle bearings of rotatable tool base holder or bearing or mounting systems of the turret.

Another object of this invention is to provide an apparatus which can be easily handled, is of comparatively low capital cost and is easily maintained.

It is yet another object of this invention to provide a method and apparatus of the type described which can be utilized both for nonrotating and for rotating tools.

Still another object of our invention is to provide an assembly for the releasable retention of a tool head and which is of simple and economical construction and is simple and easy to operate.

SUMMARY OF THE INVENTION

In principle, this invention is distinguished over the prior art systems described above in that the release of the tool carrier or tool head from the tool base holder or a shaft formed thereon, is effected by simultaneously applying a force to the tension rod against the force of the disk-spring stack while simultaneously applying a counterforce to the tool base holder or its shaft which are traversed by the tension rod.

The method of the invention in more specific terms is a method of operating a tool head adapted to be releasably received in the assembly, the assembly comprising:
  a tool turret;
  a tool base holder mounted on the tool turret releasably receiving the tool head and formed with a mechanism engageable with the tool head for retaining the tool head on the tool base holder;
  a tension rod displaceable axially relative to the tool base holder and operatively connected with the mechanism for actuating same to selectively retain and release the tool head; and
  a disk-spring stack bearing upon the rod for applying stress thereto to bias the rod into a position in which the mechanism retains the tool head on the tool base holder.

The method comprising the steps of:
(a) pressing the rod in a direction opposite the direction in which the rod is biased by the disk-spring stack with a force sufficient to overcome the force applied by the disk-spring stack to the rod to operate the mechanism to release the tool head while simultaneously applying to the tool base holder an external counterforce in the direction in which the rod is biased, thereby relieving the tool turret from tool release forces; and
(b) removing the tool head from the tool base holder.

The assembly with which the present invention is concerned can comprise:
  a tool head adapted to be releasably received in the assembly;
  a tool turret;
  at least one tool base holder mounted on the tool turret releasably receiving the tool head and formed with a mechanism engageable with the tool head for retaining the tool head on the tool base holder;
  a tension rod displaceable axially relative to the tool base holder and operatively connected with the mechanism for actuating same to selectively retain and release the tool head;
  a disk-spring stack bearing upon the rod for applying stress thereto to bias the rod into a position in which the mechanism retains the tool head on the tool base holder; and
  means for pressing the rod in a direction opposite the direction in which the rod is biased by the disk-spring stack with a force sufficient to overcome the force applied by the disk-spring stack to the rod to operate the mechanism to release the tool head while simultaneously applying to the tool base holder an external counterforce in the direction in which the rod is biased, thereby relieving the tool turret from tool release forces.

It will be apparent, therefore, that during the application of the spring-relief force to the tension rod, in the form of a compression force applied to an end thereof in a direction opposite to the disk-spring force, a counterforce is applied to the tool base holder of its shaft traversed by the tension rod so that the original force and the counterforce are subsequently equal in magnitude and the tool base holder and the turret are thereby relevant from any force applied by the release unit during the release of the tool.

According to a further feature of the invention, the release unit comprises a cylinder movable in the axial direction of the tension rod and provided with jaws which can be coupled directly to the cylinder or connected to the cylinder through a member which, in turn, has a screwthread connection to the cylinder.

The jaws can engage behind a flange, shoulder or abutment of the tool base holder or its shaft extending away from the tool head, when the tool base holder is revolved on the turret into alignment with the release unit.

A piston within the cylinder has a compression bar or plunger axially juxtaposed with the end of the tension rod and adapted to press the latter in a direction opposite the spring bias applied thereto by the stack of disk-spring.

Upon pressurization of the cylinder with a fluid medium, e.g. a hydraulic or gaseous fluid, the cylinder or piston are displaced in opposite directions because they are floatingly mounted.

The holding jaws during this displacement are fixed to the cylinder while the tension rod is urged in the opposite direction by the plunger which engages and end face of this tension rod.

Since the holding jaws apply equal and opposite forces via the cylinder to the tool shaft or tool base holder as is applied to the tension rod by the piston and the plunger, there is no net force applied during the release of the tool head to the turret or to the bearings or the like which may journal the tool base holder upon the turret. The reaction force need not be taken up by the bearings of the turret and the active forces required are all applied from the exterior.

As a consequence, the tool spindle bearings and the bearings of the turret disk are free from vibration shocks, force pulses or the like both during and prior to the tool change.

As has been noted earlier, an important aspect of the invention is the spacially fixed location of the release unit relative to the turret casing. The release unit can be fastened on the turret casing with respect to which the turret disk rotates.

The release unit outwardly extending arm which can be adjustably fixed to the turret casing, e.g. by a pin or screw.

The piston can be pressed by a spring against the housing of the release unit so that, following release of the tool head and relief of the pressure in the aforementioned space, a return shift of the piston can be effected.

Preferably, in a similar manner, a spring means is provided between the cylinder and the housing and can include one or more disk springs or Belleville springs.

For a secure rotation or engagement of the tool shaft by the jaws, the latter can be formed if at least two arms which extend from the cylinder toward the tool base holder and which are formed at the ends with dogs engaging behind the aforementioned shoulder or flange. To define the surface of the flange engageable by the dogs, an annular groove may be formed in the rear end of the tool shaft.

The release plunger can have a preferably central axial bore, opening at the end of the plunger turned toward the end of the tension rod, and connected with a compressed air line or fitting. If the tool base holder is likewise formed with a conically shaped bore, compressed air can be fed to the tool base holder so that this compressed air is distributed in the bore of the tool base holder accommodating the tool head and rod upon release so that this region is cleaned from chips and residues.

Upon locking of the mechanism to a tool head, the pressure built up in the passage in the plunger can be used as a control signal or position indication for the machine tool.

According to a further feature of the invention, the housing is swingably mounted on the turret casing and/or is axially shiftable thereon. Preferably the holding jaws are replaceably connected with the shoulder or the intermediate member screwed onto the latter.

BRIEF DESCRIPTION OF THE DRAWING

The above objects, features and advantages of our invention will become more readily apparent from the following description, reference being made to the accompanying drawing in which.

SPECIFIC DESCRIPTION

Figure 1:
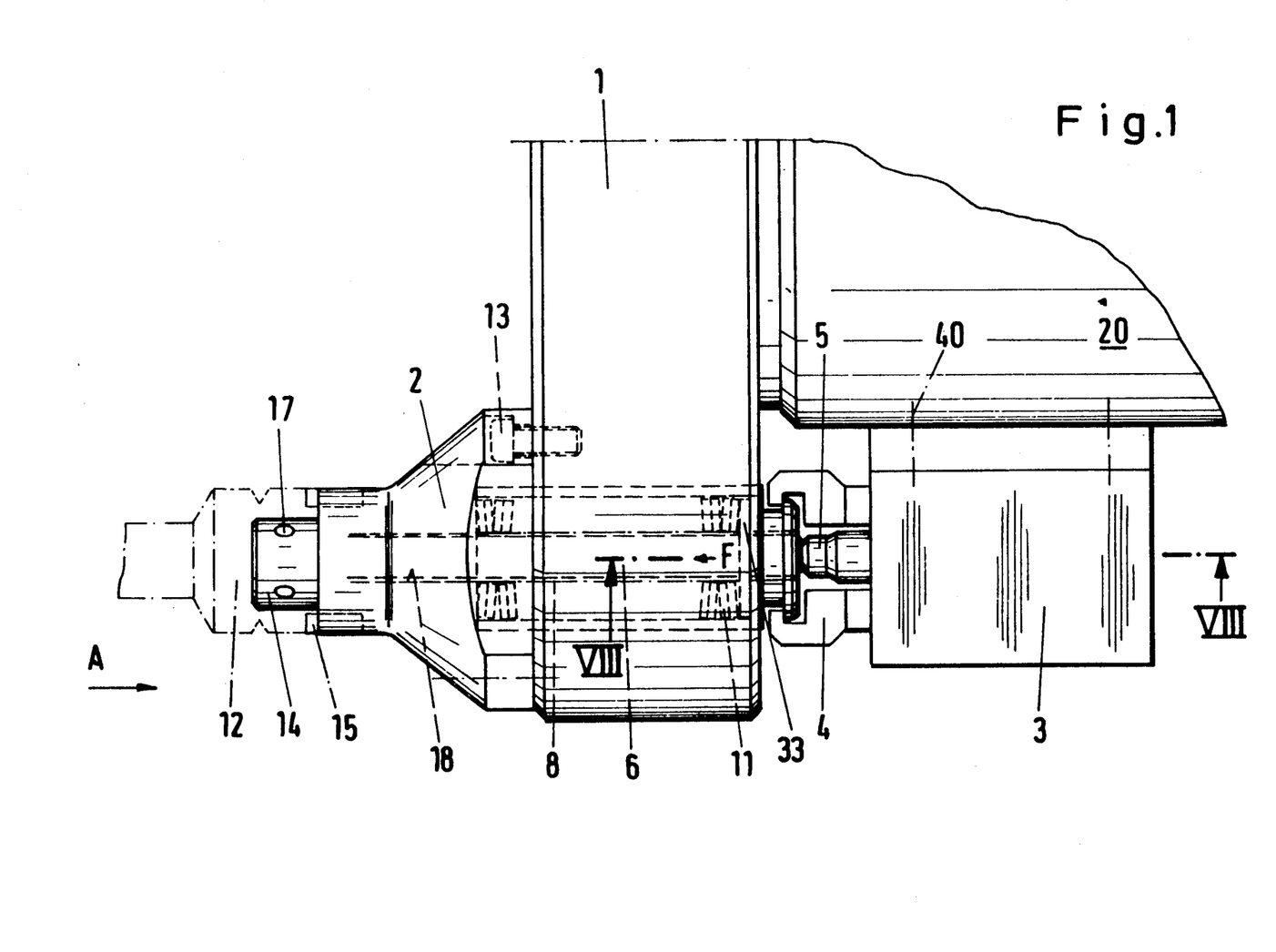
FIG. 1 is a schematic elevational view of a tool clamped in a tool base holder of a tool turret for a machine tool and showing the tool base holder engaged in the release unit.

The system illustrated in FIG. 1 comprises a tool turret 1 which has a disk 1' rotatable on a fixed turret casing 20 by any conventional tool turret rotating device. The turret is intended to carry a plurality of tool base holders 2 angularly equispaced about the disk and all are equivalent to the one which has been illustrated in FIG. 1. Various tool heads can be coupled to the respective tool base holders and, although not shown it may be automated. The assembly of FIG. 1 can be used with an automated tool change system in which a tool is removed from the tool base holder by the gripper carried to a tool magazine, a new tool is removed from the magazine, and the new tool placed on the tool base holder.

The tool base holder 2 comprises a central bore 18 in which a tension rod 6 is axially movable.

At a head end of the tension rod 2, within a stub 14 of the tool base holder, a mechanism for locking a tool head to the tool base holder is provided. This mechanism can have radially movable members 17, here shown to be clamping pins, which are driven outwardly by a camming action of a conical-surface on the left-hand end of the tension rod 6. A similar system is described in German Patent Document 30 07 440.

The radially movable pins may, as is described in the last-mentioned reference, also include an acute angle with the axis of the assembly.

The clamping and locking of a tool head 12 to the tool holder 2 is effected by placing the tool head 12 over the stub 14 and thereby inserting the stub 14 in a corresponding recess of the tool head. The tension rod is permitted to move to the right, in a direction in which it is biased by a stack 11 of disk springs or Belleville springs 11 seated on an annular flange 33 affixed to the rod 6. The spring stack thus moves the rod 6 to the right to drive the pin 17 radially outwardly into correspondingly formed passages in the tool head 12

For tool change, it is necessary to apply a force to the tension rod in a direction opposite the bias of the spring stack 11, i.e. in the direction of arrow F to overcome the force of the disk spring stack and displace the rod 6 to the left sufficiently to enable the pins 17 to be radially retracted in the receiving stub 14. The tool head can then be removed. The tool head can have the configuration shown in FIG. 2 and in the aforementioned German Patent Document 30 07 440.

Figure 10:
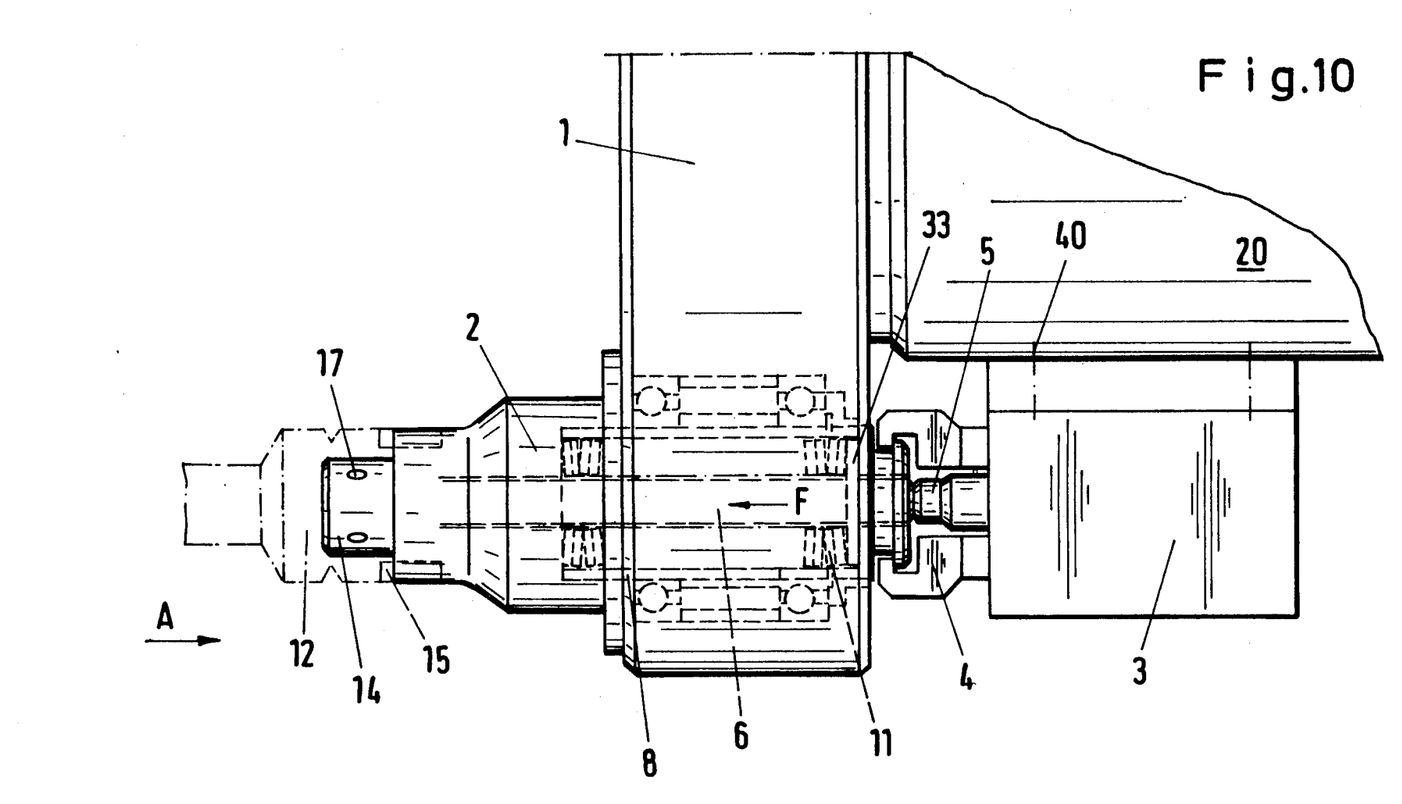
FIG. 10 is a cross-sectional view corresponding to FIG. 1 showing the application of the invention as in the embodiment of FIG. 1, to a tool base holder which is rotatable in the turret, i.e. has spindle bearings.

A flat or key 15 can be provided to angularly couple the tool head with the holder 2 so that the tool can be held against rotation if so desired, but can be rotatably driven if spindle bearings are provided as illustrated, for example, in FIG. 10.

Figure 3:
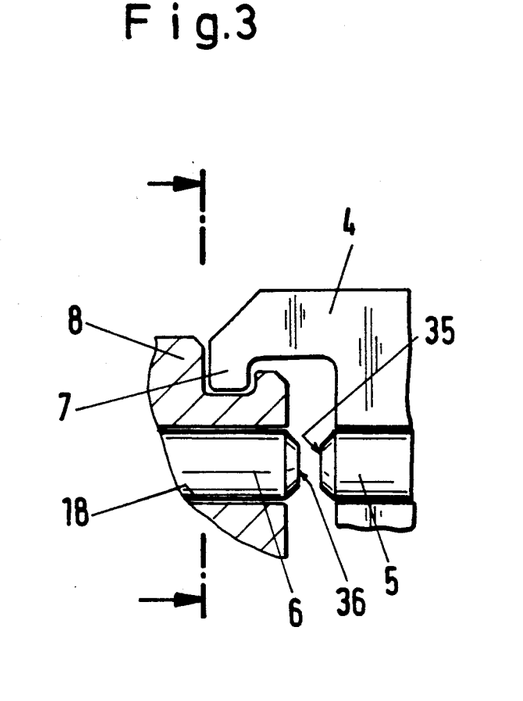
FIG. 3 is a cross-sectional view, greatly enlarged in scale of the region in which a jaw is engaged with a shaft of the tool base holder according to the invention.
Figure 4:
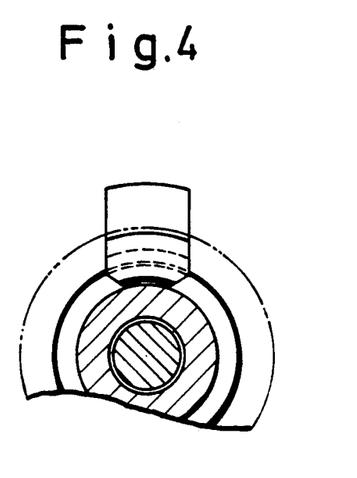
FIG. 4 is a view similar to FIG. 3 showing the relative positions of the parts during the release operation.
Figure 5:
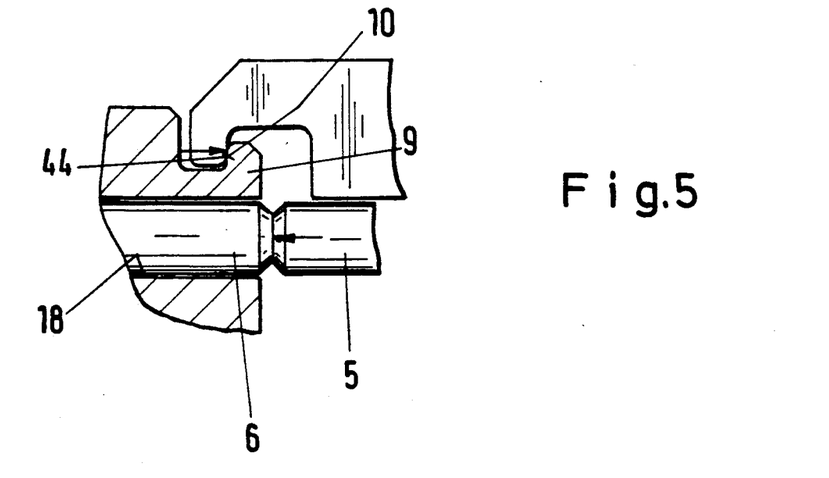
FIG. 5 is a cross-sectional view taken along the line V—V of FIG. 3.

The release unit 3 according to the invention, comprises a holding gripper having jaws 4 whose arms have at the ends thereof, respective inner projections or dogs 7 engageable behind an abutment ring or shoulder 9 defined in the end of the shaft 8 of the tool base holder, by an annular groove 44 (see FIGS. 3-5).

From the release unit 3, moreover, a pressure plunger 5 projects centrally between the jaws 4 and can abut an end face of the tension rod 6 (FIGS. 3-5). The release unit 3 is connected by the bolts represented diagrammatically at 40 to the turret casing 20 (see FIG. 1).

Figure 2:
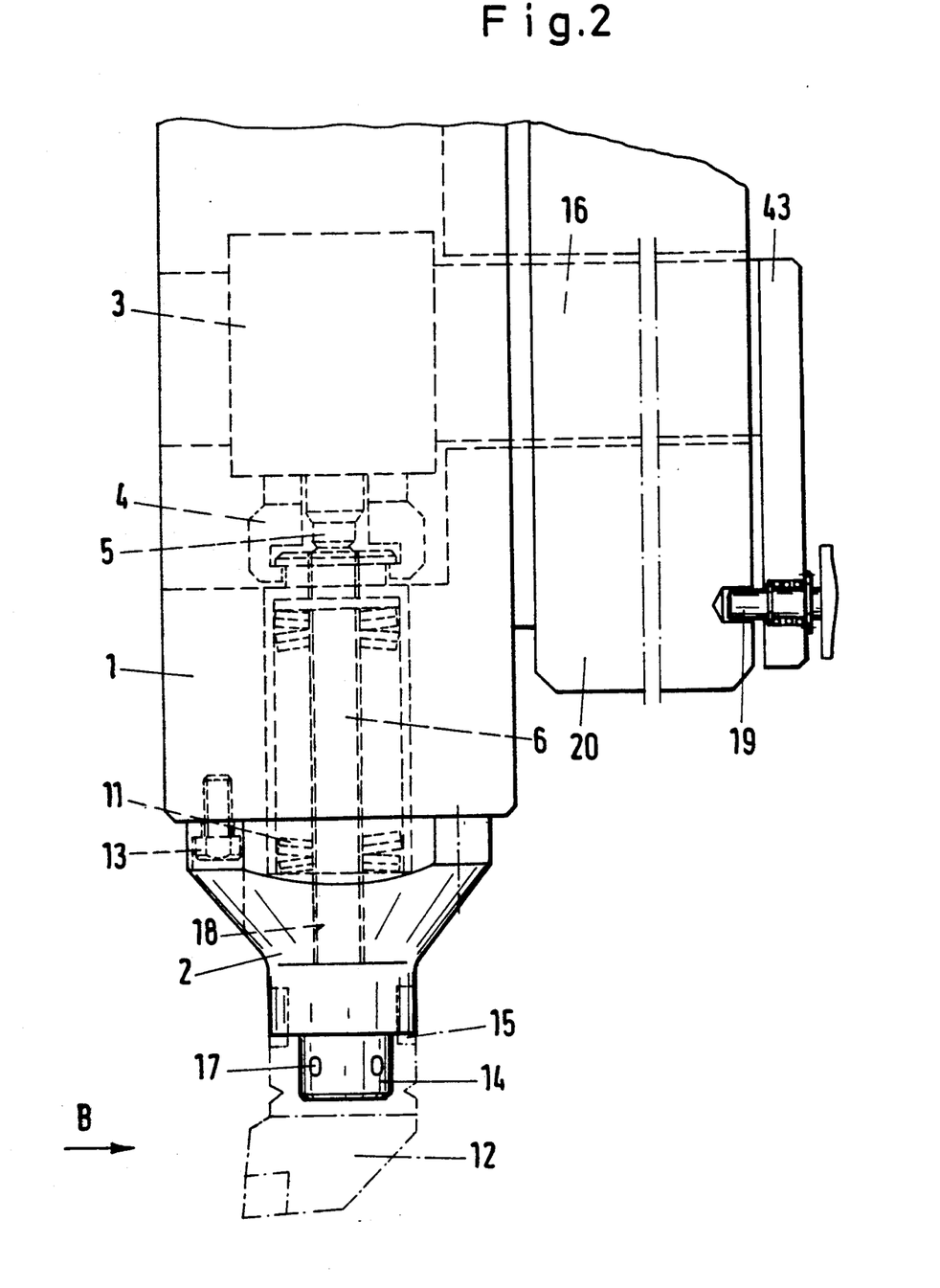
FIG. 2 is a diagrammatic fragmentary elevational view of a system in which the release unit is mounted within the turret disk for a star-type turret.

FIG. 2 shows an embodiment of the invention in which the release unit 3 is located within a central cavity 1b formed in the turret disk 1c and centered on the axis of rotation thereof (not visible in FIG. 2). The disk 1c is mounted on the turret casing 20 which is stationary and can rotate to swing the radial tool holders 2 into machining position.

To support the release unit 3 in the cavity 1b, a support beam 16 is provided and the position of the release unit can be set via a radially extending arm 43 connected to the beam 16 and engaging via a set screw or adjustment screw 19, the turret casing 20.

Turning again to FIGS. 3-5, it can be observed that the dogs 7 engage in the groove 44 and have their inner ends 10 spaced from the floor of this groove to permit relative movement of the dogs and the shoulder 9.

A comparison of FIGS. 3 and 4 will show, initially, when the tool holder is brought into position for release of the tool head, the dogs 7 are received in the groove 44 with play (FIG. 3). However, as the jaws 4 are drawn to the right and the plunger 5 is driven to the left, the jaws 4 come into engagement with the abutment 9 and the rod 6 is driven to the left to release the tool in the manner described.

The plunger 5 is hydraulically or pneumatically displaced to the left while the jaws 4 are displaced to the right with equal and opposite force (see the force arrows in FIG. 4).

Figure 6:
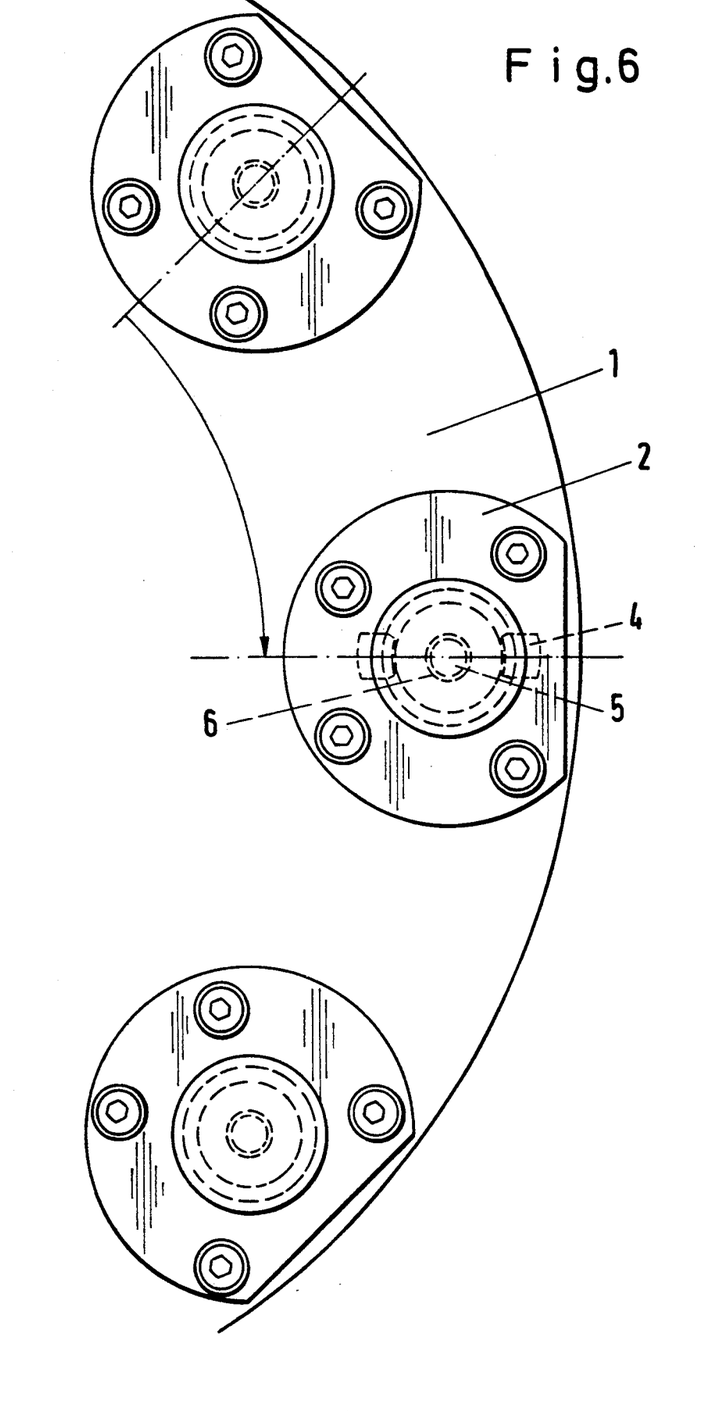
FIG. 6 is a fragmentary front-elevational view of the tool turret utilizing the release unit in the configuration of FIG. 7.
Figure 7:
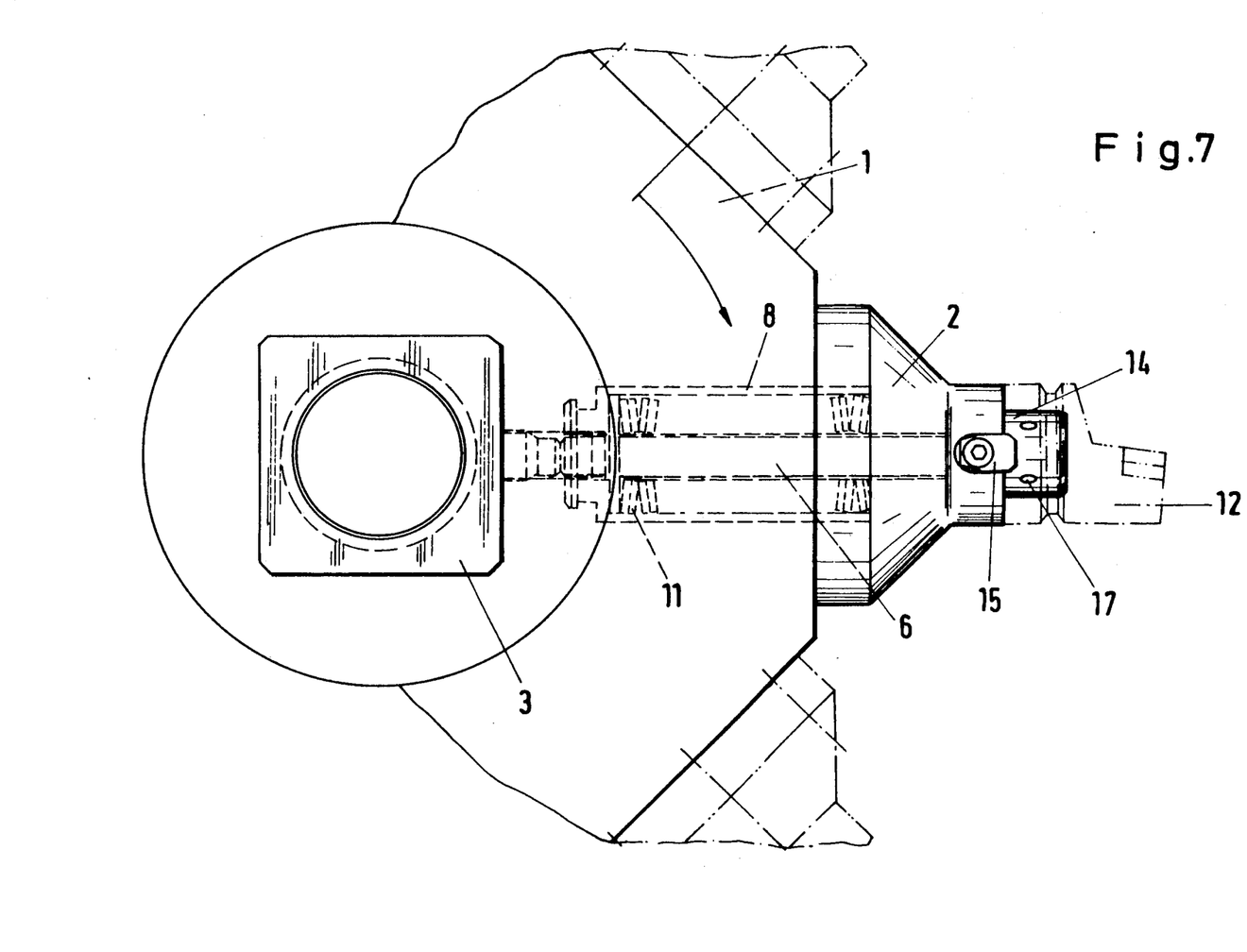
FIG. 7 is a side-elevational view of the embodiment of FIG. 2 taken in the direction of the arrow VII of FIG. 2.
Figure 8:
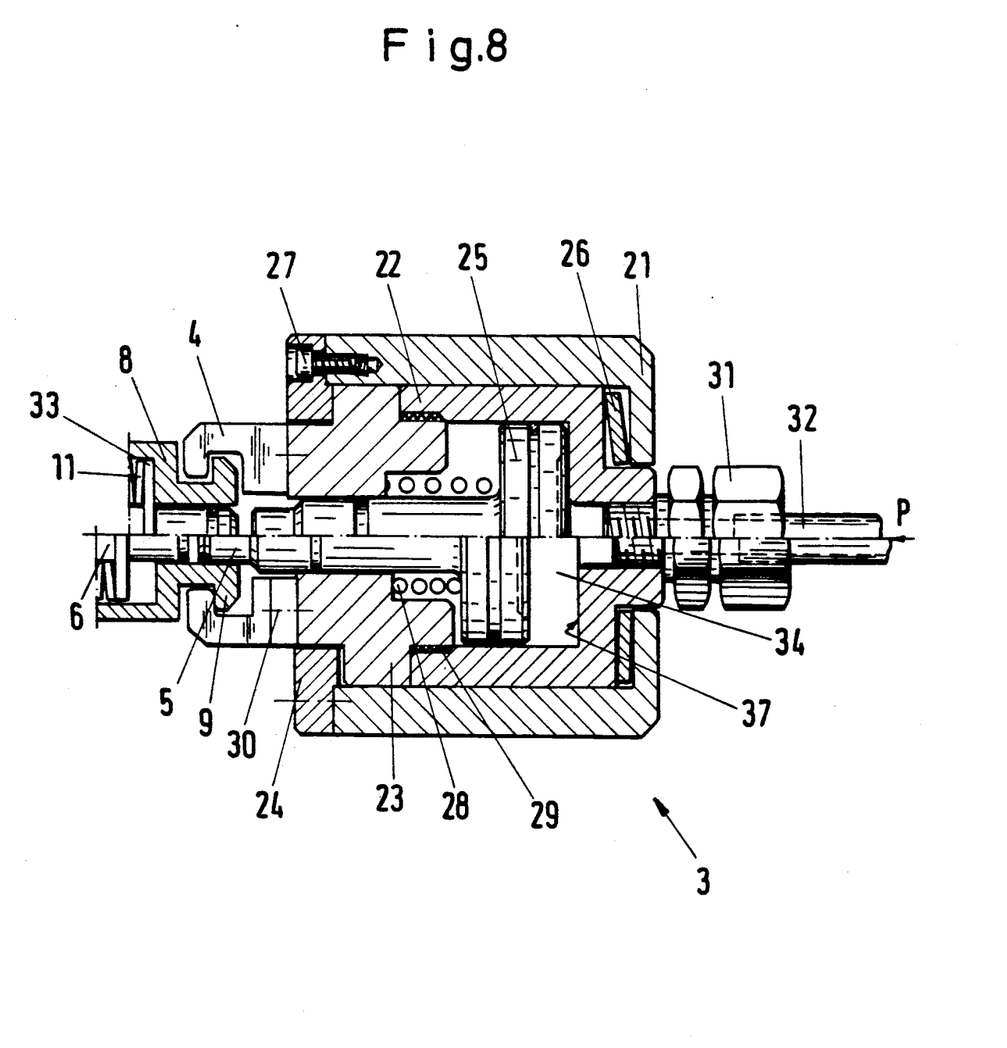
FIG. 8 is a cross-sectional view taken along the line VIII—VIII of FIG. 1.

FIGS. 6 and 7 represent additional views of the release unit 3 and its relationship to the turret. FIG. 8 is a sectional view which will further clarify the operation of the release unit.

In the tool-engaging position, the shoulder or flange 33 is in its extreme right-hand position. Under the force applied by the precompressed spring stack 11. The force applied by this spring stack is sufficient to prevent separation of the tool head 12 from the stub 14. The clamped position is represented at the upper halves of FIGS. 8 and 9, respectively, while the lower halves of these FIGURES will show the position of these parts in a tool head release position.

The release unit 3 comprises a housing 21 in which a cylinder 22 is axially shiftable against the pressure of a disk spring 26.

The cylinder 22 is formed at its inner surface and at the left-hand end illustrated with an internal screwthread which threadedly engages a complementary thread of a connecting member 23. Screws 30 releasably attach the arms of the jaws 4 to this connecting member 23. At its left-hand side visible in FIG. 8, the housing 21 is shown to be connected to a cover 24 by screws 27.

In the cylinder 22, a piston 25 defines a pressurizable space or cylinder chamber 34. The piston 25 can be displaced to the left against the force of a spring 28 braced upon the member 23 and thus interposed between the piston and the housing.

The screwthread between the cylinder 22 and the connecting member 23 is represented at 29 and the bolts 30 between the jars 4 and the cylinder 22.

The piston 25 is formed directly with the plunger 5 as a piston rod.

Cylinder chamber 34 can be supplied with a fluid medium under pressure via threaded fitting 31 connecting a hydraulic or pneumatic line or pipe 32 to the cylinder 22.

When the fluid medium is introduced under pressure to the chamber 34, the piston 25 is displaced to the left against the force of the spring 28. While the cylinder 22 is displaced to the right against the force of the spring 26. The piston and cylinder have similarly dimensioned pressurizable surfaces in the chamber 34 so that the forces generated by the piston and cylinder in opposite directions are the same.

As the piston 22 is moved to the right, the dogs 7 come into engagement with the rear surface of the flange 9. The movement of the plunger 5 to the left drives the rod 6 (see FIG. 5 and the lower half of FIG. 8).

Figure 9:
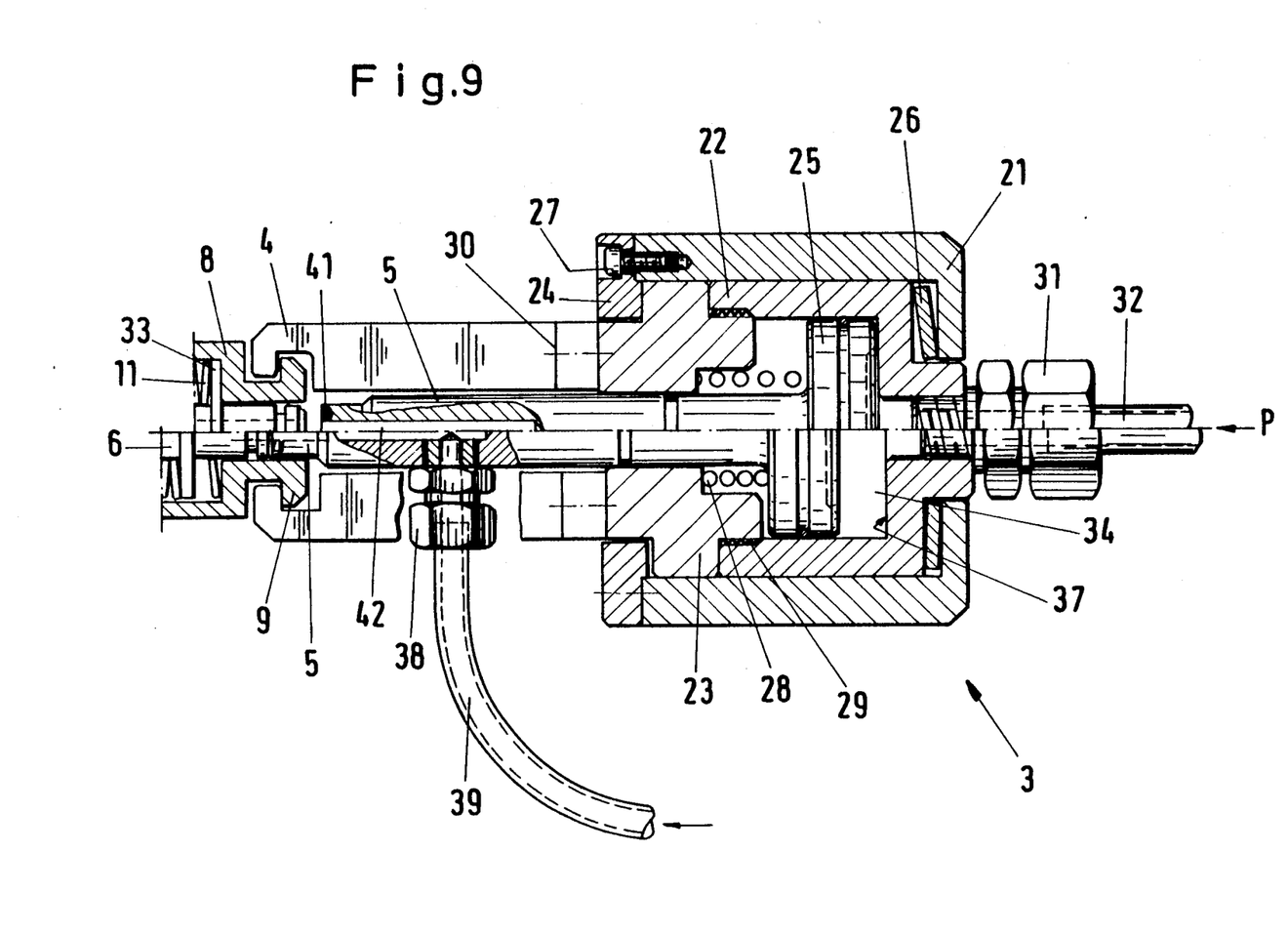
FIG. 9 is a cross-sectional view of another release unit in which compressed air is supplied to a bore in the plunger.

In the embodiment of FIG. 9, the plunger 5 has a central bore 42 which is connected by a threaded fitting 38 and a pipeline 39 with a source of compressed air. An O-ring seal 41 is provided around the bore 42 at the end face of the plunger 5.

The device of the invention operates as follows: by rotation of the turret to bring a tool holder to be subjected to a tool change into position, the shaft 8 of that tool holder is brought between the jaws 4 of the release unit 3, i.e. the tool change position.

The tool shaft end 9 is thus coupled with the jaws 4 and the rods 6 are aligned with the plunger 5.

The tool head 12 can only be removed after the release mechanism has been actuated and the rod 6 is displaced with its flange 33 against the resistance of the spring stack 11 in the direction of the tool head 12 axially. The higher axial force required for this purpose and which otherwise would be taken up fully by the bearings of the turret is prevented from developing because of the holding jaws 4 automatically grip the end of the tool holder and apply a counter force in the opposite direction so that the flanks of the dogs 7 will come into engagement with the rear force of the abutment ring 9. The rod-pressing force F is thus fully taken-up by the release unit and the reaction forces developed by the latter can be transferred to the turret housing or casing directly, thereby avoiding any strain on the bearings. Other parts of the turret also do not receive any significant loading during this operation. For the tool change, hydraulic fluid, for example, can be fed to the cylinder chamber 24 to displace the shaft 8 and the rod 6 axially in opposite directions. Initially, the two surfaces 35 and 36 of the rod 6 and the plunger 5 are brought together and, after they meet, a pressure increase effects the displacement of the rod to compress the spring stack 11. The required stroke of displacement of the rod for release of the tool is met by this hydraulic arrangement.

The tool head can then be removed and another tool head inserted in position. The release of the hydraulic pressure from chamber 34 permits the spring stack to again lock a tool head in place.

Upon termination of the tool change, the hydraulic pressure P in the cylinder chamber 34 is reduced and the springs 26 and 28 can move the plunger 5 and the cylinder 22 into their original positions.

The piston 25 with its plunger 5, the cylinder 22, the springs 26 and 28, connecting member 23 are all received in the housing 21 which can be closed by the cover 24 in a reliable, compact and stable construction.

FIG. 9 shows that compressed air can be fed from the plunger through a bore in the rod 6 to blow clean the region in which the tool head is coupled to the tool holder. In the manner described, the compressed air supplied to the plunger can be used to signal the position after engagement of the tool head.

In FIG. 10, we have shown a system similar to that of FIG. 1 and operating in the same fashion, except that the tool holder 2 can be seen to be journaled on the turret 1 by spindle bearings to allow rotation of this tool holder.

We claim:

1. A method of operating a tool-mounting assembly for a machine tool in which said assembly comprises:
    a tool head adapted to be releasably received in said assembly;
    a tool turret;
    a tool base holder mounted on said tool turret releasably receiving said tool head and formed with a mechanism engageable with said tool head for retaining said tool head on said tool base holder, said tool base holder being formed with a tool shaft having a shoulder at an end opposite an end of said tool base holder receiving said tool head and being rotatable on said tool turret into a position in which said shoulder is engaged by a pair of jaws; and
    a tension rod displaceable axially relative to said tool base holder and operatively connected with said mechanism for actuating same to selectively retain and release said tool head; and a disk-spring stack bearing upon said rod for applying stress thereto to bias said rod into a position in which said mechanism retains said tool head on said tool base holder, said method comprising the steps of:
(a) pressing said rod in a direction opposite the direction in which said rod is biased by said disk-spring stack with a force sufficient to overcome the force applied by said disk-spring stack to said rod to operate said mechanism to release said tool head;
(b) simultaneously with step (a) applying to said tool base holder an external counterforce substantially equal to said force sufficient to overcome the force applied by said disk-spring stack to said rod in said direction in which said rod is biased, thereby relieving said tool turret from tool release forces, said force being sufficient to overcome the force applied by said disk-spring stack to said rod and being applied to an end face of said rod passing through said shaft by a piston rod of a piston displaceable in a cylinder movable in a direction opposite said piston by fluid pressurization of said cylinder and operatively connected with said jaws adapted to exert said counterforce and located in a fixed position relative to a rotatable casing of said tool turret; and
(c) removing said tool head from said tool base holder.

2. A tool-mounting assembly for a machine tool, comprising:
a tool head adapted to be releasably received in said assembly;
a tool turret having a tool turret disk;
at least one tool base holder mounted on said tool turret releasably receiving said tool head and formed with a mechanism engageable with said tool head for retaining said tool head on said tool base holder;
a tension rod displaceable axially relative to said tool base holder and operatively connected with said mechanism for actuating same to selectively retain and release said tool head;
a disk-spring stack bearing upon said rod for applying stress thereto to bias said rod into a position in which said mechanism retains said tool head on said tool base holder; and
means for pressing said rod in a direction opposite the direction in which said rod is biased by said disk-spring stack with a force sufficient to overcome the force applied by said disk-spring stack to said rod to operate said mechanism to release said tool head while simultaneously applying to said tool base holder an external counterforce in said direction in which said rod is biased, thereby relieving said tool turret from tool release forces, said means for pressing said rod and for applying said counterforce including a release unit comprising:
holding jaws engageable with said tool base holder;
a cylinder provided with a fitting adapted to receive a fluid under pressure and axially fixed to said jaws and axially shiftable relative to said tool turret;
a piston axially displaceable in said cylinder by said fluid under pressure; and
a pressing plunger connected to said piston and aligned with said rod for engaging said rod to drive said rod in said direction opposite the direction in which said rod is biased by said disk-spring stack with said force sufficient to overcome the force applied by said disk-spring stack to said rod.

3. The assembly defined in claim 2 wherein said release unit is connected by a connecting beam with a swing-out arm and can be fixed or adjustably connected by an adjusting screw with a casing of the tool turret.

4. A tool-mounting assembly for a machine tool, comprising:
a tool head adapted to be releasably received in said assembly;
a tool turret having a tool turret disk;
at least one tool base holder mounted on said tool turret releasably receiving said tool head and formed with a mechanism engageable with said tool head for retaining said tool head on said tool base holder;
a tension rod displaceable axially relative to said tool base holder and operatively connected with said mechanism for actuating same to selectively retain and release said tool head;
a disk-spring stack bearing upon said rod for applying stress thereto to bias said rod into a position in which said mechanism retains said tool head on said tool base holder; and
means for pressing said rod in a direction opposite the direction in which said rod is biased by said disk-spring stack with a force sufficient to overcome the force applied by said disk-spring stack to said rod to operate said mechanism to release said tool head while simultaneously applying to said tool base holder an external counterforce in said direction in which said rod is biased, thereby relieving said tool turret from tool release forces, said means for pressing said rod and for applying said counterforce comprising a release unit, said release unit comprising:
holding jaws engageable with said tool base holder;
a cylinder provided with a fitting adapted to receive a fluid under pressure and axially fixed to said jaws and axially shiftable relative to said tool turret;
a piston axially displaceable in said cylinder by said fluid under pressure; and
a pressing plunger connected to said piston and aligned with said rod for engaging said rod to drive said rod in said direction opposite the direction in which said rod is biased by said disk-spring stack with said force sufficient to overcome the force applied by said disk-spring stack to said rod, said release unit being swingably mounted on a casing of said tool turret.

5. A tool-mounting assembly for a machine tool, comprising:
a tool head adapted to be releasably received in said assembly;
a tool turret having a tool turret disk;
at least one tool base holder mounted on said tool turret releasably receiving said tool head and formed with a mechanism engageable with said tool head for retaining said tool head on said tool base holder;
a tension rod displaceable axially relative to said tool base holder and operatively connected with said mechanism for actuating same to selectively retain and release said tool head;
a disk-spring stack bearing upon said rod for applying stress thereto to bias said rod into a position in which said mechanism retains said tool head on said tool base holder; and means for pressing said rod in a direction opposite the direction in which said rod is biased by said disk-spring stack with a force sufficient to overcome the force applied by said disk-spring stack to said rod to operate said mechanism to release said tool head while simultaneously applying to said tool base holder an external counterforce in said direction in which said rod is biased, thereby relieving said tool turret from tool release forces, said means for pressing said rod and for applying said counterforce comprising a release unit, said release unit comprising:

holding jaws engageable with said tool base holder;

a cylinder provided with a fitting adapted to receive a fluid under pressure and axially fixed to said jaws and axially shiftable relative to said tool turret;

a piston axially displaceable in said cylinder by said fluid under pressure; and a pressing plunger connected to said piston and aligned with said rod for engaging said rod to drive said rod in said direction opposite the direction in which said rod is biased by said disk-spring stack with said force sufficient to overcome the force applied by said disk-spring stack to said rod, said release unit being axially shiftably mounted on a casing of said tool turret.

6. A tool-mounting assembly for a machine tool, comprising:

A tool head adapted to be releasably received in said assembly;

a tool turret;

at least one tool base holder mounted on said tool turret releasably receiving said tool head and formed with a mechanism engageable with said tool head for retaining said tool head on said tool base holder;

a tension rod displaceable axially relative to said tool base holder and operatively connected with said mechanism for actuating same to selectively retain and release said tool head;

a disk-spring stack bearing upon said rod for applying stress thereto to bias said rod into a position in which said mechanism retains said tool head on said tool base holder; and means for pressing said rod in a direction opposite the direction in which said rod is biased by said disk-spring stack with a force sufficient to overcome the force applied by said disk-spring stack to said rod to operate said mechanism to release said tool head while simultaneously applying to said tool base holder an external counterforce in said direction in which said rod is biased, thereby relieving said tool turret from tool release forces, said means for pressing comprising a release unit disposed in a path of said tool base holder upon rotation thereof on said tool turret, said tool base unit being brought into axial alignment with said release unit, said release unit comprising:

holding jaws engageable with said tool base holder;

a cylinder provided with a fitting adapted to receive a fluid under pressure and axially fixed to said jaws and axially shiftable relative to said tool turret;

a piston axially displaceable in said cylinder by said fluid under pressure; and a pressing plunger connected to said piston and aligned with said rod for engaging said rod to drive said rod in said direction opposite the direction in which said rod is biased by said disk-spring stack with said force sufficient to overcome the force applied by said disk-spring stack to said rod.

7. The assembly defined in claim 6 wherein said release unit has a housing in which said cylinder is axially movable, said housing being fixed to a casing of said tool turret.

8. The assembly defined in claim 7 wherein said release unit further comprises a spring braced between said housing and said piston.

9. The assembly defined in claim 7 wherein said release unit further comprises at least one disk spring braced between said housing and said cylinder.

10. The assembly defined in claim 7 wherein said holding jaws comprise at least two arms extending from said cylinder and inwardly projecting holding dogs at ends of said arms, said tool base holder being formed with a shaft traversed by said rod and extending toward said retaining unit, said shaft having an annular shoulder at an end thereof opposite said tool head and behind which said dogs engage to exert said counterforce on said tool base holder.

11. The assembly defined in claim 7 wherein said pressing plunger is formed with an axial bore opening at an end thereof confronting said rod, and means for connecting a compressed air source to said axial bore.

12. The assembly defined in claim 11 wherein said axial bore is disposed centrally in said plunger.

13. The assembly defined in claim 7 wherein said jaws are replaceably connected to said cylinder.

* * * * *